(12) United States Patent
Kauper

(10) Patent No.: US 10,562,110 B2
(45) Date of Patent: Feb. 18, 2020

(54) ROTARY TOOL AS WELL AS CARRIER AND CUTTING INSERT FOR SUCH A ROTARY TOOL

(71) Applicant: Kennametal Inc., Latrobe, PA (US)

(72) Inventor: Herbert Rudolf Kauper, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/101,945

(22) Filed: Aug. 13, 2018

(65) Prior Publication Data

US 2019/0047060 A1 Feb. 14, 2019

(30) Foreign Application Priority Data

Aug. 14, 2017 (DE) .......................... 10 2017 214 165

(51) Int. Cl.
*B23B 51/02* (2006.01)
*B23B 51/06* (2006.01)
*B23Q 11/10* (2006.01)

(52) U.S. Cl.
CPC .......... *B23B 51/06* (2013.01); *B23Q 11/1023* (2013.01); *B23B 51/02* (2013.01); *B23B 2251/02* (2013.01); *B23B 2251/043* (2013.01)

(58) Field of Classification Search
CPC ... B23B 51/042; B23B 51/0486; B23B 51/06; B23C 5/28; B23C 2210/02; B23D 77/006; Y10T 408/455
See application file for complete search history.

(56) References Cited

U.S. PATENT DOCUMENTS 3,368,257 A * 2/1968 Andreasson ........ B23B 51/0486
407/11
3,889,520 A * 6/1975 Stoferle .................... G01N 3/58
73/37.5

(Continued)

FOREIGN PATENT DOCUMENTS

DE    102014211414 B3    12/2015
DE    102014109390 A1    1/2016

OTHER PUBLICATIONS

Jun. 12, 2018 Foreign OA.

*Primary Examiner* — Nicole N Ramos
(74) *Attorney, Agent, or Firm* — Ian K. Samways

(57) ABSTRACT

The invention relates to a rotary tool as well as to a carrier and a cutting insert of such a rotary tool. The carrier comprises a seat, which comprises several lateral surfaces, between which the cutting insert can be inserted. The cutting insert comprises, for each of the lateral surfaces, a contact surface which abuts against the respective lateral surface in an inserted state. At least one coolant channel is formed, which comprises a first partial channel and a second partial channel, which adjoins the first partial channel, wherein the first partial channel proceeds within the carrier up to an outlet opening, wherein the second partial channel proceeds within the cutting insert from an inlet opening up to a coolant outlet, wherein the outlet opening and the inlet opening form an interface for transferring coolant from the carrier to the cutting insert. The outlet opening is arranged in one of the lateral surfaces and the inlet opening is arranged in one of the contact surfaces.

20 Claims, 1 Drawing Sheet

(56) References Cited

U.S. PATENT DOCUMENTS

| | | | | |
|---|---|---|---|---|
| 6,012,881 | A * | 1/2000 | Scheer | B23B 31/008 408/145 |
| 6,485,235 | B1 * | 11/2002 | Mast | B23B 51/02 408/1 R |
| 8,678,722 | B2 * | 3/2014 | Aare | B23B 51/02 408/230 |
| 10,058,930 | B2 * | 8/2018 | Schwaegerl | B23B 51/02 |
| 10,071,430 | B2 * | 9/2018 | Frota de Souza Filho | B23B 51/06 |
| 2004/0074674 | A1 * | 4/2004 | Thomas | B23B 51/02 175/393 |
| 2010/0266357 | A1 * | 10/2010 | Kretzschmann | B23B 51/02 408/204 |
| 2013/0034399 | A1 * | 2/2013 | Omagari | B23C 5/109 409/136 |
| 2013/0223943 | A1 * | 8/2013 | Gey | B23B 51/06 408/59 |
| 2015/0306685 | A1 * | 10/2015 | Rakes | B24D 5/02 407/11 |
| 2016/0214187 | A1 * | 7/2016 | Fukata | B23C 5/10 |
| 2017/0028480 | A1 * | 2/2017 | Schwagerl | B23B 51/02 |
| 2017/0050248 | A1 * | 2/2017 | Luik | B23B 51/06 |

* cited by examiner

ROTARY TOOL AS WELL AS CARRIER AND CUTTING INSERT FOR SUCH A ROTARY TOOL

RELATED APPLICATION DATA

The present application claims priority pursuant to 35 U.S.C. § 119(a) to German Patent Application No. 102017214165.4 filed Aug. 14, 2017, which is incorporated herein by reference in its entirety.

FIELD

The invention relates to a rotary tool comprising a carrier and a cutting insert as well as to a corresponding carrier and a corresponding cutting insert.

BACKGROUND

A rotary tool, in short tool, serves to machine a workpiece. Given specific materials or machining methods, an additional supply of coolant or lubricant is necessary or at least advantageous. Since the thermal load is generally highest at the machining site, i.e., at the contact point of the tool on the workpiece, it is moreover expedient to deliver the coolant to this site. To this end, the tool often times comprises at least one coolant channel, by means of which a lubricant can also generally be delivered. The coolant channel extends thereby along the tool such that an outlet opening results at a suitable point. For example, in the case of a rotary tool, the outlet opening of the coolant channel can be arranged on the end surface side or in flutes of the rotary tool.

Particularly highly loaded rotary tools are moreover often times designed to be modular. Such a modular rotary tool generally comprises a carrier, to which is attached a cutting insert, which engages with the workpiece during operation. In this case, the carrier comprises a seat, into which the cutting insert is inserted. The coolant is generally conveyed in the direction of the cutting insert via a coolant channel introduced into the carrier, since the cutting insert is generally loaded more than the carrier and requires appropriate cooling. It is basically possible to guide the coolant channel exclusively through the carrier to the front side of the tool. In doing so, the coolant however cannot be conveyed arbitrarily close to the contact point. In DE 10 2014 108 220 A1, for example, a transfer of the coolant from the carrier to the cutting insert therefore takes place first in order to ultimately deliver the coolant via coolant outlets of the cutting insert on the end surface side.

To this end, the coolant channels first extend along the carrier and then transition into the cutting insert. The transition in this case takes place in the axial direction and at interfaces of the coolant channels arranged at the seat bottom of the seat.

SUMMARY

Against this background, it is an aim of the invention to specify a modular rotary tool with improved coolant supply. A corresponding carrier and a corresponding cutting insert are also to be specified.

The task is achieved by a rotary tool having the features according to claim 1, by a carrier having the features according to claim 14, and by a cutting insert having the features according to claim 15. Advantageous embodiments, refinements and variants are the subject matter of the dependent claims. The embodiments with respect to the rotary tool also apply analogously to the carrier and the cutting insert, and vice versa.

The rotary tool serves to in particular machine a workpiece and, for this purpose, rotates during operation about an axis of rotation proceeding in a longitudinal direction. The rotary tool is in particular a drill. The rotary tool extends in the longitudinal direction and comprises a carrier as well as a cutting insert, i.e., the rotary tool is designed to be modular. On the rear side, the carrier comprises a shaft, by means of which the carrier can be inserted, in particular clamped, into a machine tool. The cutting insert serves to machine the workpiece and engages with it during operation. The cutting insert is, for example, a cutting plate or a cutting head. The cutting insert preferably comprises a number of cutting edges, particularly preferably two cutting edges. The carrier and the cutting insert can in particular be connected by means of a coupling. The carrier and the cutting insert are arranged one behind the other in the longitudinal direction.

The carrier comprises a seat, which comprises several lateral surfaces, between which the cutting insert can be inserted. The carrier moreover comprises in particular a seat bottom, which is bordered and delimited by the lateral surfaces. The seat bottom in particular proceeds horizontally, i.e., orthogonally to the longitudinal direction. The lateral surfaces respectively proceed vertically, i.e., parallelly to the longitudinal direction. The seat is formed as a recess in the carrier and is generally approximately U-shaped. The carrier in particular comprises a number of lateral arms, which surround the cutting insert in the inserted state and on which one of the lateral surfaces is respectively arranged on the inside. The cutting insert comprises, for each of the lateral surfaces, a contact surface which abuts against the respective lateral surface in an inserted state. In doing so, the contact surface and the lateral surface do not necessarily have to be congruent.

In the rotary tool, at least one coolant channel is formed, which serves to supply a coolant from a rear side of the rotary tool to a front side. Within the scope of the present application, the term "coolant" also refers to lubricant or coolant and lubricant. The coolant channel comprises a first partial channel and a second partial channel, which adjoins the first partial channel. The coolant channel in particular consists of only one first and one second partial channel each. The first partial channel proceeds within the carrier up to an outlet opening. The outlet opening is formed on the carrier. The second partial channel proceeds within the cutting insert and extends from an inlet opening up to a preferably front-side coolant outlet. Via the coolant outlet, the coolant is discharged from the rotary tool in the direction of the workpiece. The outlet opening in the carrier and the inlet opening in the cutting insert form an interface for transferring coolant from the carrier to the cutting insert. To this end, the outlet opening and the inlet opening coincide in the assembled state. In the present case, the outlet opening is arranged in one of the lateral surfaces and the inlet opening is arranged in one of the contact surfaces so that the interface is formed laterally and not axially. "Laterally" is generally understood to mean in particular "transversely to the longitudinal direction" or more generally "in a direction that does not correspond to the longitudinal direction", i.e., generally in an inclined manner with respect to the longitudinal direction, i.e., orthogonally or alternatively obliquely to the longitudinal direction.

The number of lateral arms, lateral surfaces, contact surfaces, and coolant channels respectively preferably corresponds to the number of cutting edges of the cutting insert.

In the case of several coolant channels, the coolant channels are preferably designed to be similar.

An essential aspect of the invention consists in particular in the coolant supply from the carrier to the cutting head now taking place laterally, i.e., in particular orthogonally to the longitudinal direction. This is in particular in contrast to the method of DE 10 2014 108 220 A1 mentioned at the beginning, in which the coolant supply takes place axially, i.e., in the longitudinal direction and through the seat bottom. In such an axial coolant transfer, corresponding leakage results. In the lateral, i.e., in particular radial, coolant transfer according to the invention, the seat bottom is however correspondingly unloaded and leakage of coolant is also advantageously avoided or at least significantly reduced. At the same time, the transfer of coolant to the cutting insert and the positioning of the coolant outlets on the cutting insert ensure that the coolant is discharged as closely as possible to the point where cooling is particularly required. This is in contrast to such designs in which the coolant outlets are arranged on the carrier and the cutting insert itself does not comprise any coolant channels. In these designs, cooling is only possible to a limited extent. In contrast, particularly optimal cooling is ensured in the present case as a result of the arrangement of the coolant outlets in the cutting insert.

In a suitable embodiment, the first partial channel first proceeds in the longitudinal direction through the carrier to the front side and is subsequently bent on the front side and there proceeds transversely to the longitudinal direction, i.e., as described above, at an incline to the longitudinal direction, and in particular in or counter to a direction of rotation of the rotary tool or in a radial direction. In other words: The first partial channel has a bent course and proceeds from a rear side of the carrier in the longitudinal direction, i.e., axially, up to a front side of the carrier, in particular up to one of the lateral arms of the carrier, and then curves laterally there, in particular at an angle of 90°, so that a lateral outlet opening results. The first partial channel thus follows an L-shaped course overall. The first partial channel preferably proceeds helically from the rear side and follows in particular a number of flutes, which are introduced into the carrier.

The second partial channel expediently follows a curved or inclined course, in particular with respect to the longitudinal direction, and first extends, starting from the inlet opening, in the radial direction and then curves in the longitudinal direction and toward the front side. In other words: The second partial channel proceeds at an incline or is curved, e.g., L-shaped. The curved course makes it possible to have the second partial channel end at any point of the cutting head and thus to arbitrarily and therefore optimally position the coolant outlet.

However, a straight course between the inlet opening and the coolant outlet is also suitable. In a suitable embodiment, the second partial channel then follows a straight course. Such a straight course can be manufactured particularly easily, particularly against the background that a particularly hard material is expediently used to produce the cutting insert.

In a particularly preferred embodiment, the lateral surfaces and the contact surfaces are formed as torque transfer surfaces, which are pressed onto each other during operation of the rotary tool. A coolant transfer in the torque transfer surfaces is particularly advantageous since these torque transfer surfaces are in principle pressed against each other during operation and leakage of coolant is thereby particularly effectively prevented. A torque transfer surface is in particular characterized in that it interacts with another torque transfer surface and that a torque transfer from the carrier to the cutting insert and vice versa thereby takes place.

The carrier and the cutting insert respectively comprise in particular a number of clamping surfaces, which are pressed against each other in the assembled state in order to clamp the cutting insert in the carrier. The clamping surfaces are thus in particular part of the coupling. The aforementioned torque transfer surfaces are however in particular not clamping surfaces. Basically also suitable is a design in which the lateral surfaces are designed as clamping surfaces so that the coolant transfer takes place through the clamping surfaces.

The clamping surfaces are however preferably free of outlet and inlet openings. This is based on the consideration that the clamping surfaces achieve a clamping effect, which holds the cutting insert in the carrier, by means of friction and that this friction would be reduced by additional outlet and inlet openings. By arranging the interface outside the clamping surfaces, i.e., by coolant transfer outside the clamping surfaces, a particularly robust connection between the cutting insert and the carrier is thus ensured.

On the front side, the cutting insert comprises a number of end faces. A respective end face is in particular a clearance surface which adjoins a cutting edge of the cutting insert in a direction of rotation. Thus, an end face is formed for each cutting edge. In this respect, the direction of rotation is the direction in which the rotary tool rotates during material machining. In order to ensure optimal coolant supply to the workpiece, the coolant outlet is formed inside the end face. The coolant outlet is thus in particular necessarily arranged behind the cutting edge in the direction of rotation. In particular, a coolant outlet is respectively formed in each end face.

The end face is in particular delimited by a cutting edge as well as by a rear edge, which follows the cutting edge in the direction of rotation. The end face is moreover delimited outwardly in the radial direction by a circumferential edge and inwardly in the radial direction in particular by a cross-cutting edge or tool tip. In a preferred embodiment, the coolant outlet is then arranged on the rear edge. In other words: The coolant outlet is located partially inside the end face and partially in another clearance surface or partially in a flute that adjoins the end face. Coolant discharge thus takes place both in the axial direction from the end face as well as in the lateral direction thereto and counter to the direction of rotation.

Alternatively to the aforementioned positions of the coolant outlet, other positions are also suitable. In an advantageous variant, the cutting insert comprises a flute and the coolant channel opens out into the flute. In other words: The coolant outlet is arranged in a flute of the cutting insert.

In a suitable development, the coolant channel opens out into a clearance surface of the flute or into a point thinning of the flute or into both. The flute thus comprises a clearance surface or a point thinning, which is arranged on the front side, or both a clearance surface and a point thinning. The coolant channel then opens out into the flute by the coolant channel opening out into either the clearance surface or the point thinning or both. In the latter case, the clearance surface and the point thinning in particular adjoin each other at a boundary line and the coolant channel opens at the boundary line. In a suitable embodiment, the boundary line corresponds in particular to the above-described rear edge.

The described embodiments with the different positions of the coolant outlet can also advantageously be combined with each other. In a suitable embodiment, the second partial channel is designed to be branched, i.e., with several arms, and comprises several coolant outlets but in particular still only one inlet opening. The different coolant outlets of the single second partial channel are then advantageously arranged at different locations in order to ensure a particularly needs-based and effective coolant supply. In doing so, the coolant outlets do not necessarily have to have identical cross-sections; rather, the cross-section of a respective coolant outlet and in particular also of the associated arm is expediently selected depending on the cooling capacity required at the respective location.

Particularly preferred is an embodiment, in which the carrier comprises a number of flutes as well as a core, which is delimited by the flutes, and wherein the first partial channels in particular proceed completely outside the core. This external arrangement of the first partial channels significantly improves the robustness of the carrier and thus of the entire rotary tool. In the case of a coolant transfer in the seat bottom, the first partial channels must necessarily proceed approximately centrally in the carrier, i.e., in the core, whereby the core is correspondingly weakened. As a result of the coolant transfer taking place laterally in the present case, it is however advantageously possible to position the first partial channels completely outside the core and to keep the core free of coolant channels. The core is in particular defined as the area of the carrier up to which the flutes extend. The core then has a radius that results as the difference between a total radius of the carrier and a depth of the flutes.

The carrier or the cutting insert or both are preferably produced by means of a 3D printing method. A 3D printing method has a particularly high degree of freedom with respect to the design of the components produced thereby so that the most varied geometries can be realized. In the present case, this is particularly advantageous with respect to the design of the coolant channels. The specific above-described courses of the coolant channels as a whole and specifically of the partial channels can be realized particularly easily within the scope of a 3D printing method.

The carrier or the cutting insert or both are preferably respectively manufactured in one piece, i.e., produced from only one material. Where applicable, an additional coating is however applied. The carrier is preferably manufactured from steel. The cutting insert is preferably manufactured from hard metal.

As already mentioned, the aim is also respectively achieved by a carrier or a shaft as described above. Advantages and developments of the carrier and of the cutting insert respectively as a single part result accordingly from the aforesaid.

BRIEF DESCRIPTION OF THE DRAWINGS

An exemplary embodiment of the invention is explained in detail below in reference to the drawing. Shown schematically in each case are.

DETAILED DESCRIPTION

Figure 1:
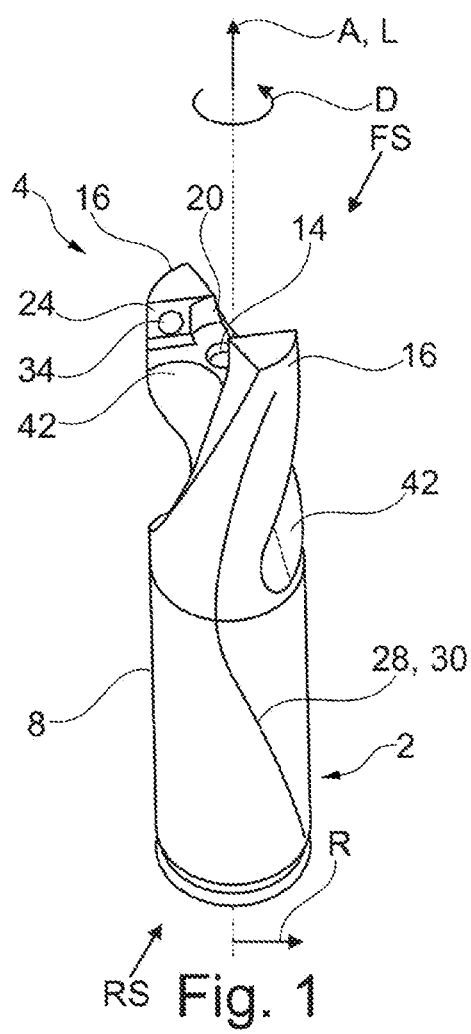
FIG. 1 a carrier for a rotary tool,
 FIG. 2 a section of the carrier in a side view,
 FIG. 3 a cutting insert for a rotary tool.
Figure 2:
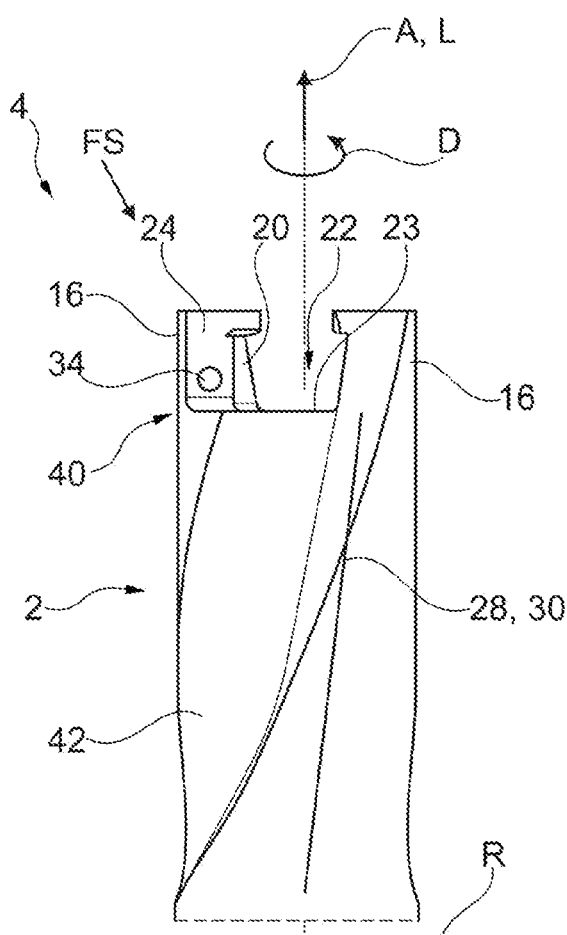
Figure 3:
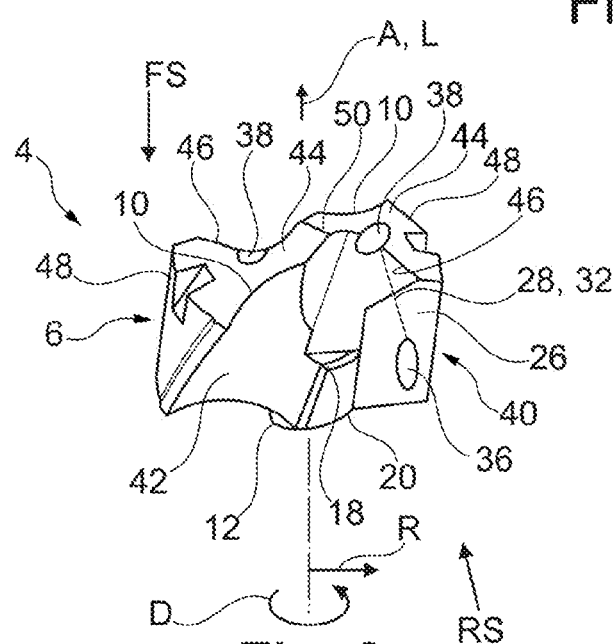

FIGS. 1 and 2 show a carrier 2 for a rotary tool 4. FIG. 1 is a perspective view and FIG. 2 is a side view. FIG. 3 shows a perspective view of a cutting insert 6, which can be inserted into the carrier 2 of FIGS. 1 and 2. The carrier 2 and the cutting insert 6 together form the rotary tool 4, i.e., the rotary tool 4 is designed to be modular.

The rotary tool 4 serves to machine a workpiece not shown and, for this purpose, rotates during operation about an axis of rotation A proceeding in a longitudinal direction L. The rotary tool 4 is in this case a drill. The carrier 2 and the cutting insert 6 respectively extend in the longitudinal direction L. On its rear side, the carrier 2 comprises a shaft 8, by means of which the carrier 2 can be clamped into a machine tool not shown. The cutting insert 6 serves to machine the workpiece and engages with it during operation. The cutting insert 6 is in this case designed as a cutting head and comprises a number of cutting edges, in this case two cutting edges 10.

The carrier 2 and the cutting insert 6 can in particular be connected by means of a coupling. In the mounted state, the carrier 2 and the cutting insert 6 are then arranged one behind the other in the longitudinal direction L. In the present case, the coupling comprises a pin 12, which is formed on the cutting insert 6, and a blind hole 14 in the carrier 2 for receiving the pin 12. The carrier 2 moreover comprises several side arms, in this case two side arms 16, for holding the cutting insert 6. In the assembled state, the side arms 16 rest on projections 18 on the cutting insert 6 so that the latter is encompassed as it were. Additionally formed both on the carrier 2 and on the cutting insert 6 are several clamping surfaces 20, by means of which the cutting insert 6 can be clamped in the carrier 2.

The carrier 2 moreover comprises as part of the coupling a seat 22, which comprises several lateral surfaces, in this case two lateral surfaces 24, between which the cutting insert 6 can be inserted. The carrier 2, more precisely the seat 22, moreover comprises a seat bottom 23, which is bordered and delimited by the lateral surfaces 24. In this case, the seat bottom 23 proceeds horizontally, i.e., orthogonally to the longitudinal direction L, and the lateral surfaces 24 respectively proceed vertically, i.e., parallelly to the longitudinal direction L. The seat 22 as a whole is formed as a recess in the carrier 2 and is approximately U-shaped as a result of the side arms 16. The cutting insert 6 comprises, for each of the lateral surfaces 24, a contact surface 26 which abuts against the respective lateral surface 24 in an inserted state.

The rotary tool 4 comprises at least one coolant channel 28, in the present case even two coolant channels 28, which are designed to be similar and which serve to supply a coolant from the rear side RS of the rotary tool 4 to the front side FS. Each coolant channel 28 comprises a first partial channel 30 and a second partial channel 32, which adjoins the first partial channel 30. The first partial channel 30 respectively proceeds completely within the carrier 2 up to an outlet opening 34. The second partial channel 32 in contrast proceeds completely within the cutting insert 6 from an inlet opening 36 up to a front-side coolant outlet 38, via which the coolant is discharged during operation from the rotary tool 4 in the direction of the workpiece. The outlet opening 34 in the carrier 2 and the inlet opening 36 in the cutting insert 6 form an interface 40 for transferring coolant from the carrier 2 to the cutting insert 6. This interface 40 is designed as a lateral or radial interface 40 by arranging the outlet opening 34 in one of the lateral surfaces 24 and the inlet opening 36 in one of the contact surfaces 26.

The first partial channel 30 first proceeds in the longitudinal direction L through the carrier 2 up to one of the side arms 16 and is subsequently bent on the front side and proceeds orthogonally to the longitudinal direction L. This can in particular be seen in FIGS. 1 and 2, in which the bent course of the first partial channel 30 is illustrated by a line. The outlet opening 34 is then formed laterally on the side arm 16. The first partial channel 30 thus follows an L-shaped course overall. In the exemplary embodiment shown, the first partial channel 30 moreover proceeds helically from the rear side RS and, in doing so, follows a number of flutes 42, which are introduced into the carrier 2.

The course of the second partial channel 32 is indicated by a line in FIG. 3. In this case, the course is straight, i.e., only inclined; in contrast, the second partial channel 32 follows a curved course in an alternative not shown. In each case, the second partial channel 32 however first extends, starting from the inlet opening 36, in the radial direction R and then curves into the longitudinal direction L and toward the front side FS.

In the exemplary embodiment of FIG. 1 through 3, the lateral surfaces 16 and the contact surfaces 16 are respectively formed as torque transfer surfaces, which are pressed onto each other during operation of the rotary tool 4. These torque transfer surfaces are different from the clamping surfaces 20. In an alternative not shown, the clamping surfaces 20 however correspond to the lateral surfaces 16 so that the coolant transfer then takes place through the clamping surfaces 20. As shown in the figures, the clamping surfaces 20 are however preferably free of outlet and inlet openings 34, 36. The interface 40 is thus arranged outside the clamping surfaces 20.

On the front side, the cutting insert 6 comprises a number of end faces, in this case two end faces 44, which respectively adjoin one of the cutting edges 10 in a direction of rotation D. Each end face 44 is delimited by a cutting edge 10 as well as by a rear edge 46, which follows the cutting edge 10 in the direction of rotation D. Each end face 44 is moreover delimited outwardly in the radial direction R by a circumferential edge 48 and inwardly in the radial direction R by a cross-cutting edge 50. An end face 44 is formed for each cutting edge 10. The direction of rotation D is the direction in which the rotary tool 4 rotates about the axis of rotation A during material machining. The coolant outlets 38 are in the present case formed inside the end faces 44, namely one coolant outlet 38 per end face 44. The coolant outlets 38 are moreover arranged behind the cutting edges 10 in the direction of rotation D. It can moreover be clearly seen in FIG. 3 that the coolant outlet 38 is arranged on the rear edge 46 and thus both in the end face 44 and in one of the flutes 42, which adjoins the end face 44 in the present exemplary embodiment. In an alternative not shown, the coolant outlets 38 are positioned at another location on the cutting insert. In this respect, almost any design possibility results. In a variant not shown, the second partial channel 32 is designed to be branched, with several arms, and comprises several coolant outlets 38.

As already mentioned, the carrier 2 comprises a number of flutes 42 in the present case. Their course defines an internal core 52, which is delimited by the flutes 42. As can be seen in FIGS. 1 and 2, the first partial channels 30 proceed completely outside the core 52, i.e., are arranged on the outside.

The invention claimed is:

1. A rotary tool which extends in a longitudinal direction and which comprises a carrier as well as a cutting insert,
    wherein the carrier comprises a seat, which comprises several lateral surfaces, between which the cutting insert is configured to be inserted,
    wherein the cutting insert comprises, for each of the lateral surfaces, a contact surface which abuts against the respective lateral surface in an inserted state,
    wherein at least one coolant channel is formed, which comprises a first partial channel and a second partial channel, which adjoins the first partial channel,
    wherein the first partial channel proceeds within the carrier and extends up to an outlet opening,
    wherein the second partial channel proceeds within the cutting insert and extends from an inlet opening up to a coolant outlet,
    wherein the outlet opening and the inlet opening form an interface for transferring coolant from the carrier to the cutting insert,
    wherein the outlet opening is arranged in one of the lateral surfaces,
    wherein the inlet opening is arranged in one of the contact surfaces, and
    wherein the lateral surfaces and the contact surfaces are designed as torque transfer surfaces, which are pressed onto each other during operation.

2. The rotary tool according to claim 1, wherein the first partial channel first extends in the longitudinal direction through the carrier to a front side and subsequently is bent on the front side and proceeds transversely to the longitudinal direction.

3. The rotary tool according to claim 1, wherein the second partial channel follows a curved course and first proceeds, starting from the inlet opening, in a radial direction and then curves in the longitudinal direction and toward a front side.

4. The rotary tool according to claim 1, wherein the second partial channel follows a straight course.

5. The rotary tool according to claim 1, wherein the carrier and the cutting insert respectively comprise a number of clamping surfaces, which are pressed against each other in the assembled state in order to clamp the cutting insert in the carrier and that the clamping surfaces are free of outlet and inlet openings.

6. The rotary tool according to claim 1, wherein the cutting insert comprises on a front side an end face, inside which the coolant outlet is formed.

7. The rotary tool according to claim 6, wherein the end face is delimited by a cutting edge and by a rear edge, which follows the cutting edge in a direction of rotation, and the coolant outlet is arranged on the rear edge.

8. The rotary tool according to claim 1, wherein the cutting insert comprises a flute and that the coolant channel opens out into the flute.

9. The rotary tool according to claim 1, wherein the coolant channel opens out into a clearance surface of the flute or into a point thinning of the flute or into both.

10. The rotary tool according to claim 1, wherein the second partial channel is designed to be branched and comprises several coolant outlets.

11. The rotary tool according to claim 1, wherein the carrier comprises a number of flutes and a core, which is delimited by the flutes, and that the first partial channels proceed outside the core.

12. The rotary tool according to claim 1, wherein the carrier or the cutting insert or both are produced via a 3D printing method.

13. The rotary cutting tool according to claim 1, characterized in wherein the rotary cutting tool is a drill.

14. A carrier for a rotary tool according to claim 1.

15. A cutting insert for a rotary tool according to claim 1.

16. The rotary cutting tool according to claim 1, wherein the torque transfer surfaces are not clamping surfaces.

17. The rotary cutting tool according to claim 1, wherein the seat is formed as a recess in the carrier.

18. The rotary cutting tool according to claim 17, wherein:
    the seat includes:
        a seat bottom, and side arms, on which the lateral surfaces are disposed, the seat being approximately U-shaped as a result of the side arms and the seat bottom.

19. The rotary cutting tool according to claim 18, wherein the seat bottom is bordered and delimited by the lateral surfaces.

20. The rotary cutting tool according to claim 18, wherein:
the seat bottom is oriented orthogonally with respect to a longitudinal direction of the rotary cutting tool, and
the lateral surfaces are oriented in parallel with respect to the longitudinal direction of the rotary cutting tool.

* * * * *